United States Patent [19]

Rakucewicz

[11] Patent Number: 4,641,693
[45] Date of Patent: Feb. 10, 1987

[54] BULK SYRUP DELIVERY SYSTEM WITH A VENT AND PRESSURE SUPPLY VALVE

[75] Inventor: John J. Rakucewicz, Northport, N.Y.
[73] Assignee: Pepsi Co, Inc., Purchase, N.Y.
[21] Appl. No.: 714,679
[22] Filed: Mar. 21, 1985
[51] Int. Cl.[4] ............................................. B65B 3/04
[52] U.S. Cl. .................................... 141/98; 141/231; 141/234; 141/326; 137/625.27; 138/111; 222/610
[58] Field of Search ..................................... 141/1-12, 141/98-107, 231, 234-248, 325-327, 346-362, 37-70, 18-29, 285-310; 285/137 R; 138/111; 137/625.27, 375, 625.67, 625.2, 625.25; 222/144.5, 132, 610

[56] References Cited

U.S. PATENT DOCUMENTS

| | | | |
|---|---|---|---|
| 2,591,118 | 4/1952 | Bent | 137/625.25 |
| 3,590,855 | 4/1969 | Woollen et al. | 138/111 |
| 3,731,905 | 5/1973 | Piet | 137/625.27 |

*Primary Examiner*—Houston S. Bell, Jr.

*Attorney, Agent, or Firm*—Scully, Scott, Murphy & Presser

[57] ABSTRACT

A bulk syrup delivery system in which a compartmentized tank delivery truck includes a plurality of separate compartments or tanks, generally one for each of several different types of soft drink syrup to provide for the bulk delivery of syrup to an account. The improvement of the subject invention concerns a three way vent and pressure supply valve designed to be utilized in the bulk syrup delivery system, particularly in an account building terminal housing associated therewith. When the terminal housing is closed, as during normal system operation, a source of pressurized gas, such as a carbon dioxide tank or cylinder, is coupled to supply pressurized gas to each syrup container for the pressurized delivery of syrup during syrup dispensing operation. Upon opening of the terminal housing, as during a syrup delivery operation, the valve is shifted to a second position wherein the source of pressurized gas is disconnected from the system, and instead the system is vented to atmosphere to vent any pressurized gas therefrom.

4 Claims, 12 Drawing Figures

BULK SYRUP DELIVERY SYSTEM WITH A VENT AND PRESSURE SUPPLY VALVE

BACKGROUND OF THE INVENTION

1. Field of the Invention

The present invention relates generally to an improvement in the Bulk Syrup Delivery System disclosed in U.S. Ser. No. 543,846, filed Oct. 20, 1983, now U.S. Pat. No. 4,553,573, which concerns a system for the bulk delivery of syrup to an account, and more particularly pertains to an integrated system for delivering a plurality of different flavored syrups to an account such as a fast food retail establishment which uses and dispenses those items in heavy volumes.

The improvement of the subject invention concerns a three way vent and pressure supply valve designed to be utilized in the bulk syrup delivery system, particularly in an account building terminal housing associated therewith. When the terminal housing is closed, as during normal system operation, a source of pressurized gas, such as a carbon dioxide tank or cylinder, is coupled to supply pressurized gas to each syrup container for the pressurized delivery of the syrup. Upon opening of the terminal housing, as during a syrup delivery operation, the valve is shifted to a second position wherein the source of pressurized gas is disconnected from the system, and instead the system is vented to atmosphere to vent any pressurized gas therefrom.

2. Discussion of the Prior Art

Soft drink syrups, such as cola syrups, flavored such as grape, lemon, root beer, syrups for diet drinks, caffein free syrups, etc. are currently delivered to accounts which dispense and sell those products in individual transfer containers or tanks, typically in five gallon volumes. A full five gallon transfer tank weighs approximately sixty pounds, and accordingly the delivery of these transfer tanks to user accounts typically requires a substantial amount of manual labor in a time consuming and labor intensive delivery operation. The transfer tanks are delivered to accounts, such as fast food establishments and restaurants having fountain service, by a delivery truck equipped to store and handle both full and empty transfer tanks.

The driver of a delivery truck of this kind must carry empty transfer accounts from the commissary area of an account and load them onto the delivery truck, and must then unload full tanks from the truck and transfer them to a commissary storage area at the account. This labor intensive operation requires a strong driver, which often restricts the type of personnel capable of making these deliveries.

A delivery operation of this nature is quite time consuming, and a very efficient delivery person can deliver possibly seven hundred and fifty to one thousand gallons of syrup per day. Moreover, the delivery person frequently has other responsibilities to be carried out at an account, such as the delivery of other account related items such as carbon dioxide tanks, paper cups, etc.

This type of prior art delivery system requires a sizable investment in transfer tanks, and also requires a substantial amount of manual labor by personnel at the account. The account personnel must periodically disconnect empty transfer tanks and reconnect full tanks in their place. Moreover, this replacement operation must be carried out in a sanitary manner, and new O rings must be installed on fittings during the connection of each full transfer tank.

A prior art delivery system of this nature has other problems associated therewith such as pilferage of syrup from partially full containers. The commissary areas of accounts also require a substantial amount of storage area for both full and empty storage transfer tanks, and these commissary areas are frequently maintained in a disorderly and unkempt manner.

A field of prior art somewhat related to the present invention exists with respect to the delivery of petroleum products, such as heating oil and gasoline, from tank delivery trucks. However, these prior art systems typically deliver to a home or station through a single passage delivery hose, and are not concerned with sanitation and other related problems of syrup distribution system analogous to the present invention.

Bonnard et al. U.S. Pat. No. 2,965,124 is somewhat of interest to the present invention by disclosing a multi-compartmented tank truck for use in the petroleum industry for the delivery of what are known as white products and brown products. White products include gasoline, while brown products include diesel fuel, kerosene etc., and mixing or contamination of the two products must be avoided or reduced to a minimum. In the disclosed arrangement, contamination between the two types of products is minimized by using separate meters and delivery hoses.

Weston et al. U.S. Pat. No. 3,360,000 is also somewhat of interest to the subject invention by disclosing a multicompartmented tank truck wherein the tank compartments have separate delivery lines leading to a distributor or junction box which has valves for routing the delivery from any compartment to either one of two outflow lines, but not both simultaneously. A manually-operable selector is coupled to the distributor valves to enable valves corresponding to selected tank compartments to be opened in an arrangement wherein the manner of opening of the valves can be selected in advance so that each tank compartment is connectable through the distributor to only a particular one of the outflow lines.

Billington et al. U.S. Pat. No. 4,230,161 is also somewhat relevant to the present invention by disclosing an arrangement in which a tank delivery truck is loaded from a bulk storage tank for the delivery of various flammable petroleum products. The disclosed arrangement includes a plurality of check valves which are provided for safety reasons in the event of an inadvertent rupture of one or more of the filler and vapor return flexible hose lines.

A commercially available system for the delivery of carbon dioxide to fast food establishments is also part of the known prior art. However, this system is somewhat analogous to the aforementioned petroleum delivery systems in that a single compartment insulated tank truck delivers carbon dioxide through a single hose to an insulated carbon dioxide storage tank in an arrangement which does not require the delivery person to have cryogenic skill.

However, none of the aforementioned fluid product delivery systems disclose a multiple product delivery system utilizing a multichannel delivery concept similar to the present invention, and none is concerned with the sanitation and other related problems of a syrup distribution system analogous to the present invention.

SUMMARY OF THE INVENTION

Accordingly, it is a primary object of the present invention to provide an improved system for the bulk delivery of syrups to an account such as a fast food retail establishment.

More particularly, the present invention concerns an improvement in the bulk syrup storage and delivery equipment at an account. The account storage and delivery equipment typically includes a plurality of separate syrup storage tanks for the different flavored syrups. The account also has a bulk syrup receiving terminal with a multichannel receiving coupling therein provided for connection to a corresponding delivery coupling provided on a delivery hose extending from a bulk syrup delivery truck. During normal operations at the account, the syrup storage tanks are pressurized to allow syrup to be pumped therefrom during syrup dispensing operations. The pressurizing equipment includes a source of pressurized gas, such as a tank of carbon dioxide, and a pressure supply line leading from the tank to the separate syrup storage tanks.

More particularly, the improvement of the present invention concerns a three way valve positioned in the pressure supply line at the account. The three way valve assumes a first position during normal syrup dispensing operations, in which pressurized gas is supplied therethrough to the separate syrup storage tanks. The valve is actuated to assume a second position when the account is to receive a bulk syrup delivery, in which the source of pressurized gas is disconnected from the syrup storage tanks, and the tanks are vented through to valve to vent any pressurized gas therein, thereby allowing a bulk syrup delivery operation to proceed.

Pursuant to the teachings of the present invention, the three way valve is mounted in a receiving terminal at the account which is usually located on an exterior wall of the account building. The receiving terminal typically comprises an openable terminal housing with a lock thereon to prevent unauthorized access. The three way valve is coupled to the openable terminal housing to assume the first position when the terminal housing is closed, as during normal syrup dispensing operations, and to assume the second position when the terminal housing is opened, as during a bulk syrup delivery operation. In greater particularity, the receiving terminal has a hinged cover, and the three way valve has an actuator shaft which is axially displaced during opening and closing of the hinged cover.

Further objects of the subject invention are the provision of a system for the bulk delivery of syrups of the aforementioned kind which: reduces delivery costs and thereby should increase sales and profits, reduces the requirement for capital equipment investment and inventory, alleviates the several previously mentioned problems associated with deliveries to commissaries, reduces both the manual labor and the time required for a delivery and simultaneously frees the delivery person for the performance of other tasks such as the delivery of other items such as cups, etc., eliminates the required handling and transfer of heavy containers and thereby eliminates the danger and safety factors associated therewith, allows deliveries of syrup to be made at more convenient times such as at night when there is less traffic, allows deliveries to be made with a minimum of inconvenience and disturbance to an account, provides a substantially totally sealed delivery system to achieve a more sanitary delivery, eliminates problems associated with pilferage of partially filled return transfer containers, is extremely attractive to and compatible with delivery to high volume accounts, allowing estimated deliveries with one tank truck to achieve delivery volumes of two thousand gallons of syrup per day, is convenient and extremely efficient in maintaining accurate records of deliveries to accounts, substantially reduces the labor and responsibilities of personnel at the account to maintain syrup containers full, allows an account to reduce syrup transfer container storage space, allows an account to relocate syrup storage containers to more remote and convenient storage areas such as basements and back rooms, eliminates the need for the return of empty or partially full transfer containers, and eliminates or substantially reduces many cleanliness and sanitary problems associated with current syrup distribution systems.

The bulk delivery system provides for the bulk delivery to an account of a plurality of different flavored syrups in which a compartmentized tank delivery truck has a plurality of separate compartments for the storage and delivery of a plurality of different flavored syrups. A multichannel delivery hose is extendible from the tank delivery truck and includes different channels for the different flavored syrups. A multichannel delivery coupling is provided at the delivery end of the multichannel hose. In different embodiments disclosed herein the multichannel delivery hose is formed as a one piece, extruded honeycomb hose, or comprises a plurality of separate tubes which are encased by an outer jacket. The multichannel delivery hose can have the channels configured with a central channel and a plurality of circumferential channels positioned therearound. Moreover, the delivery hose can advantageously include a plurality of different sized channels, with the larger sized channels being provided for flavored syrups which the account dispenses in greater volumes, and one larger sized channel is advantageously positioned as one of the circumferential channels to provide for proper positioning of the delivery coupling with respect to the receiving coupling. The central channel can also comprise a larger sized channel.

Delivery of the syrups to the account is normally accomplished by pressurizing the syrup compartments on the truck to pump the syrups into the corresponding tanks at the account, such that the syrups flow under pressure into corresponding account tanks until the latter are full, at which time an equilibrium is reached and the delivery can be terminated.

BRIEF DESCRIPTION OF THE DRAWINGS

The foregoing objects and advantages of the present invention for a bulk syrup delivery system with a vent and pressure supply valve may be more readily understood by one skilled in the art with reference being had to the following detailed description of several preferred embodiments thereof, taken in conjunction with the accompanying drawings wherein like elements are designated by identical reference numerals throughout the several views and in which.

DETAILED DESCRIPTION OF THE DRAWINGS

Figure 1:
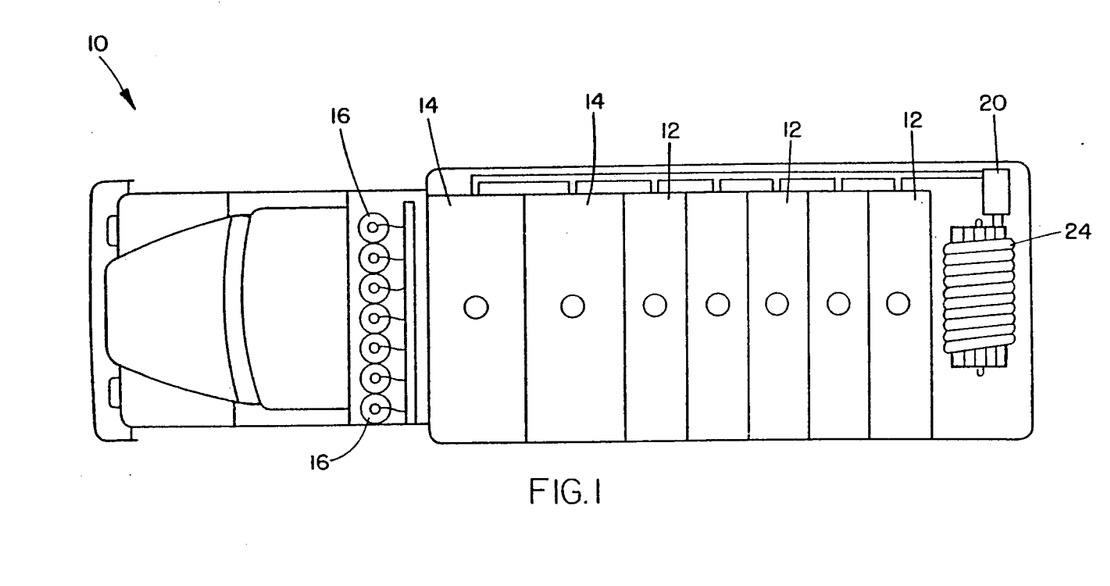
FIG. 1 is a plan view of an exemplary embodiment of a compartmentized tank, bulk syrup delivery truck constructed pursuant to the teachings of the present invention.

Referring to the drawings in detail, FIG. 1 is a plan view of an exemplary embodiment of a compartmentized tank, bulk syrup delivery truck 10 having five smaller sized syrup compartments 12, two larger sized syrup compartments 14, and seven carbon dioxide tanks 16 mounted thereon. The larger syrup compartments 16 are for the delivery of syrups such as cola syrup which accounts typically dispense in greater volumes than other different flavored syrups. The compartments 12 and 14 can contain a variety of syrups such as cola, root beer, lemon, grape or other fruit based syrups, diet syrups or caffein free syrups. Each of these syrup compartments is connected through individual flow conduits to individual delivery meters 18 in a metering arrangement 20 mounted at the rear of the truck.

Each of the metered fluids then flows into one flow channel of a multichannel delivery hose 22, which between deliveries to different accounts, is wound around a hose storage drum 24 mounted on the rear of the truck. The multichannel delivery hose in the illustrated embodiment has seven individual channels, although either a lesser or greater number of channels could be implemented in alternative embodiments depending upon the design of the delivery system and the types of accounts serviced thereby.

Figure 2:
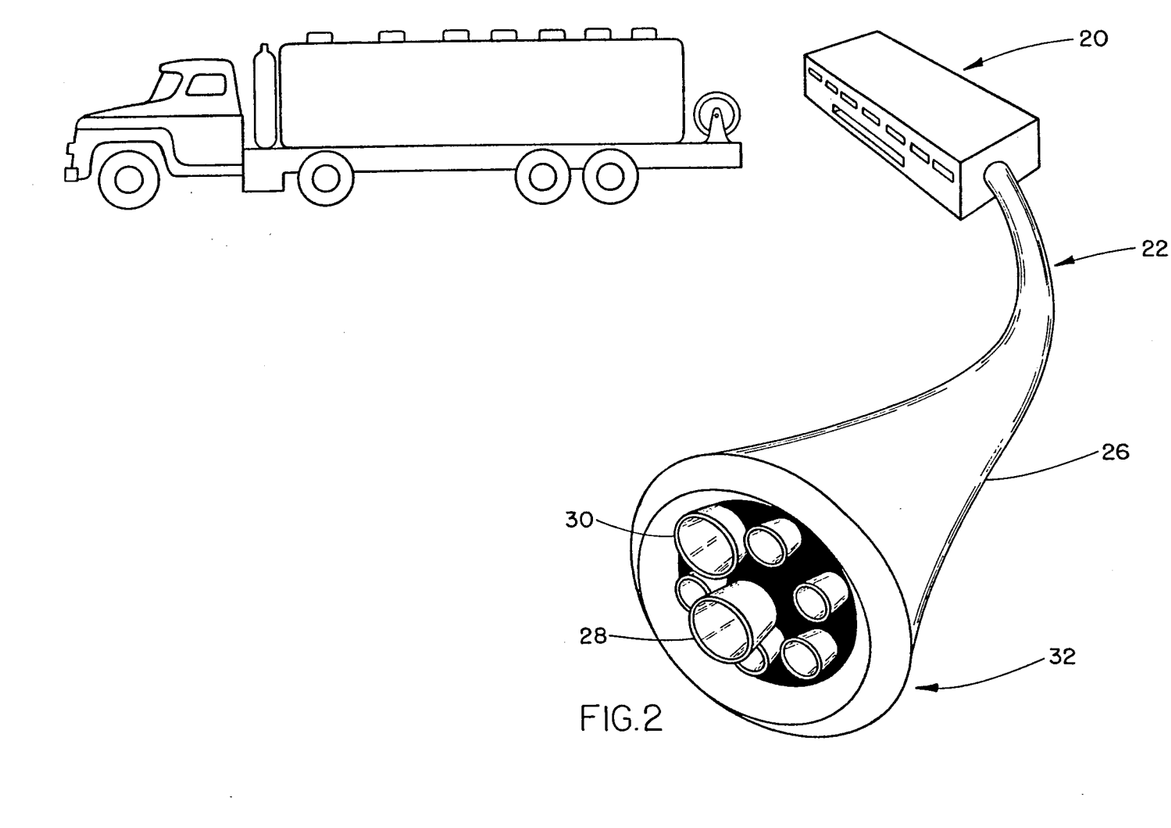
FIG. 2 illustrates an elevational view of the compartmentized tank truck and an enlarged schematic view of the metering arrangement on the tank truck and a multichannel delivery hose extending therefrom, with the delivery coupling at the end thereof being shown in enlarged detail.

The multichannel hose can be comprised of seven individual tubes, in a manner similar to the multichannel conduit of FIG. 2, which can be any type of NSF food grade approved tubing, which are encased by a suitable outer jacket 26. The center channel 28 and one circumferential or peripheral channel 30 have a larger diameter than five other peripheral channels. The larger diameter channels deliver a flavored syrup such as a cola syrup which accounts typically dispense in greater volumes than other different flavored syrups, and which are carried in the larger compartments 14 of the truck. The multichannel delivery hose terminates in a multichannel delivery coupling 32 at the delivery end of the multichannel delivery hose and having a plurality of closure valves therein, one for each channel in the delivery coupling. The multichannel delivery coupling is designed to plug in and be secured to a corresponding multichannel receiving coupling as described in greated detail hereinbelow.

The carbon dioxide tanks 16 are coupled to each of the individual syrup tanks 12 and are utilized to pressurize (e.g. 100 psi) each compartment to pump the syrups during a delivery operation into corresponding separate tanks at an account, such that the syrups flow under pressure into the corresponding tanks at an account until the tanks are full, at which time an equilibrium is reached and the delivery can be terminated.

Figure 3:
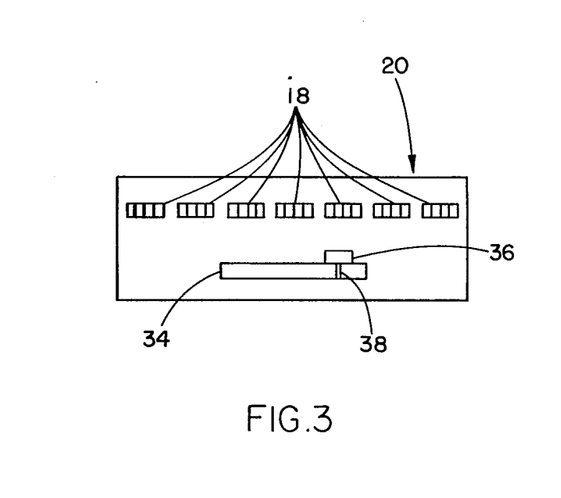
FIG. 3 is an enlarged elevational front view of only the metering arrangement of FIG. 2.

The metering arrangement 20 includes seven delivery meters 18, FIG. 3, one for each compartment, and can be somewhat automated by incorporating therein an associated receptacle 34 for receipt of a load ticket. The insertion of the load ticket into the receptacle zeroes each of the meters and enables operation of the delivery system, and the load ticket later records the quantity of each different flavored syrup delivered to an account. The zero setting of the meters can be accomplished electromechanically by microswitch 36 tripped at 38 by the load ticket, or optically by a light beam interrupted by the presence of the load ticket. The resetting of the individual meters can be accomplished in any known manner, for instance electromechanically in a manner similar to the resetting of a trip odometer in an automobile. In greater detail, each meter is coupled to a corresponding printing device. Each meter can consist of a wheel type unit in the fluid lined that is rotated by the passing of liquid. A magnetic or similar pickup is utilized to detect rotation of the wheel axled to count the revolutions of the wheel. The meter can be designed such that it must be reset to zero either mechanically or electrically before a syrup delivery operation can be initiated. Further, the meter can be designed such that delivery ticket, invoice, bill or similar document must be in place before delivery can start. This interlock can be incorporated into the zero set interlock. The document can be locked into the unit until liquid flow ceases and the meter readings are printed on the document. Restart of liquid flow will then be prohibited until another document is inserted and the meters are zeroed. A cumulative meter can also be incorporated into each unit to record the total flow of each channel. This unit can be resettable by a special key, either electrically or mechanically, and is utilized to monitor total deliveries per day or per route.

Figure 4:
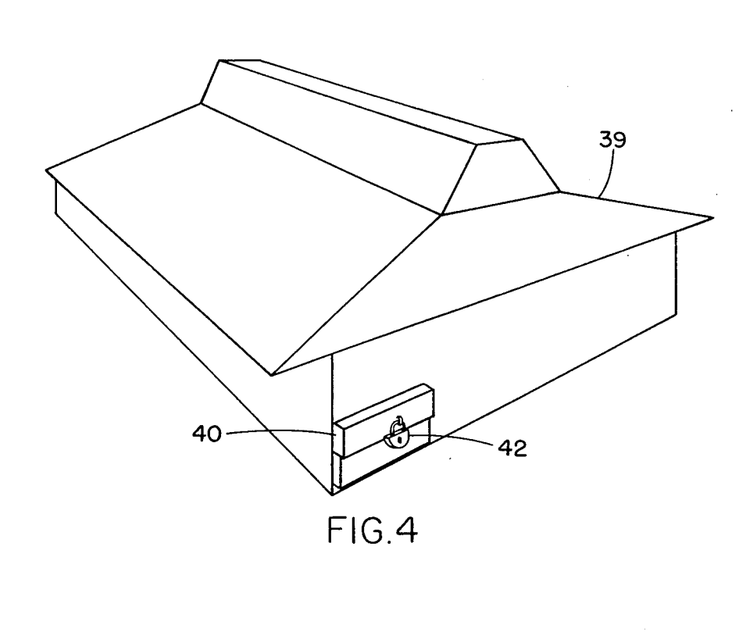
FIG. 4 illustrates a perspective view of an account building showing a syrup delivery terminal housing mounted on an exterior wall thereof.
Figure 5:
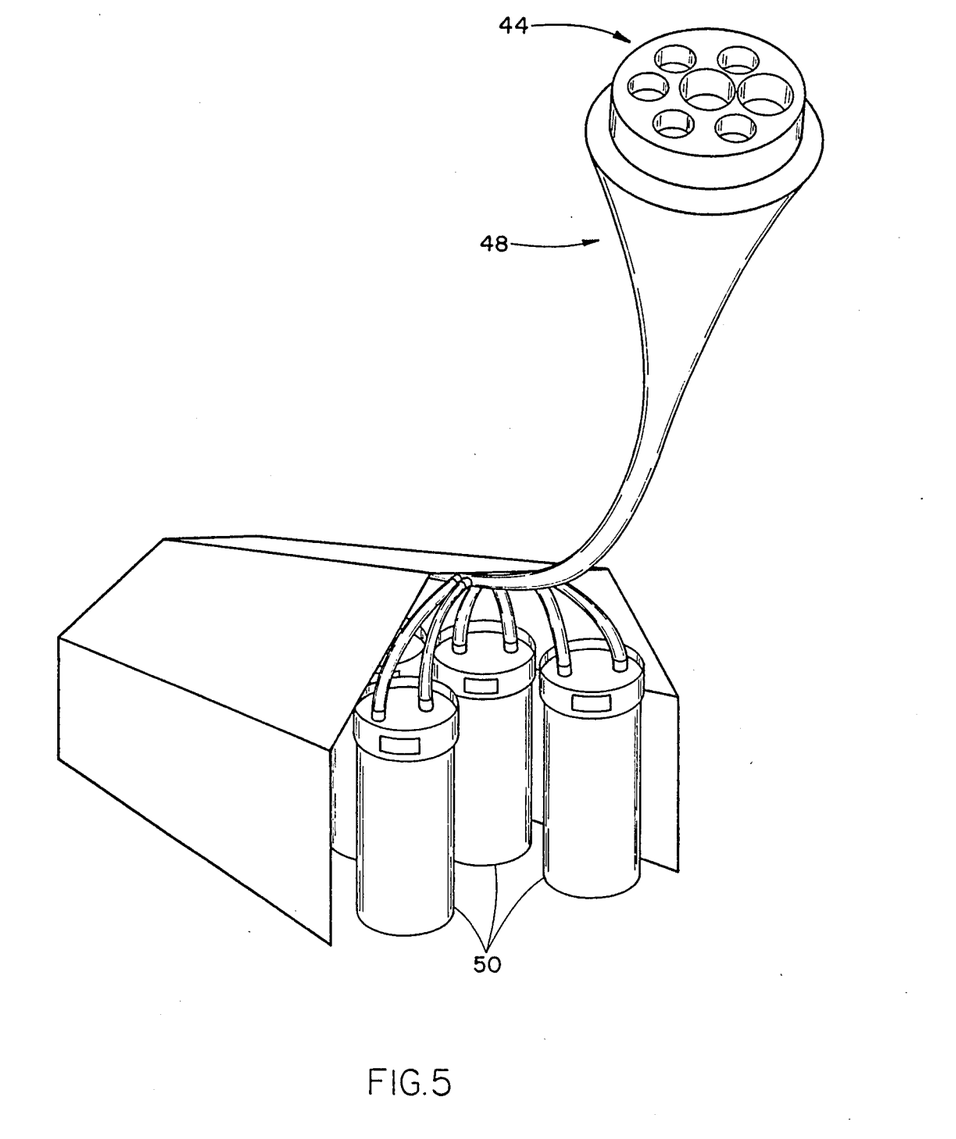
FIG. 5 is a schematic illustration of a multichannel conduit which extends from the syrup delivery terminal of FIG. 4 to a plurality of separate storage tanks located inside the account building.

FIG. 4 illustrates a perspective view of an account building 39 with a syrup delivery terminal housing 40 mounted on an exterior wall thereof. The terminal housing 40 will normally have a lock 42 thereon to prevent unauthorized access to a multichannel receiving coupling 44 mounted therein. As shown schematically in FIG. 5, a multichannel conduit 48, which can be constructed in a manner similar to the multichannel delivery hose, leads from the receiving coupling 44 to a plurality of storage tanks 50 in a commissary or other storage area of the account, with at least one storage tank being provided for each different flavor syrup. The storage tanks 50 can be transfer tanks as now in commercial usage, or can be larger storage compartments, or could be disposable types of tanks such as a bag in a box type of storage container. Advantageously, with the inventive bulk syrup delivery system, the storage containers can be stored in a remote area of the building, such as in a basement, as constant access thereto for replacement of containers is no longer required, both by the account personnel and the delivery person.

Figure 6:
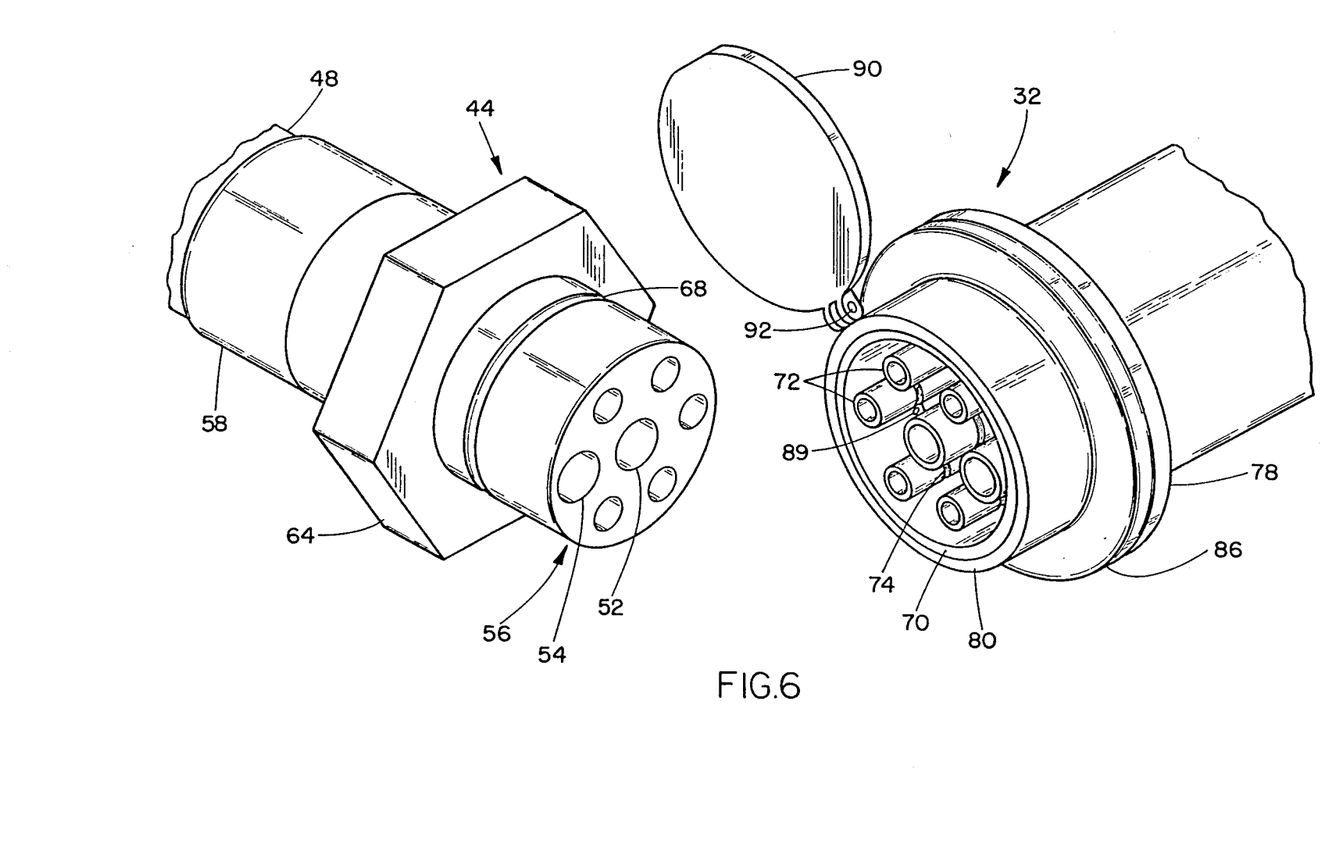
FIG. 6 illustrates a perspective view of one embodiment of a multichannel delivery coupling at the end of the delivery hose placed opposite the end of a multichannel receiving coupling which is normally positioned in a delivery terminal housing at an account building.

FIG. 6 illustrates a perspective view of one exemplary embodiment of both a multichannel delivery coupling 32 and a corresponding multichannel receiving coupling 44 adapted to mate therewith. The receiving coupling 44 includes a plurality of female channel ports configured with a central part 52 and a plurality of circumferential ports positioned therearound. The multichannel receiving coupling is also constructed with both larger and smaller sized channels therein, with the larger sized channels being provided for flavored syrups which the account dispenses in higher volumes. At least one larger sized port 54 of the coupling is positioned as one of the circumferential ports to provide for proper positioning of the receiving coupling with respect to the corresponding delivery coupling 32 at an account, as described in greater detail hereinbelow. In the illustrated embodiment the central port 52 is also utilized as a larger sized fluid channel.

Figure 8:
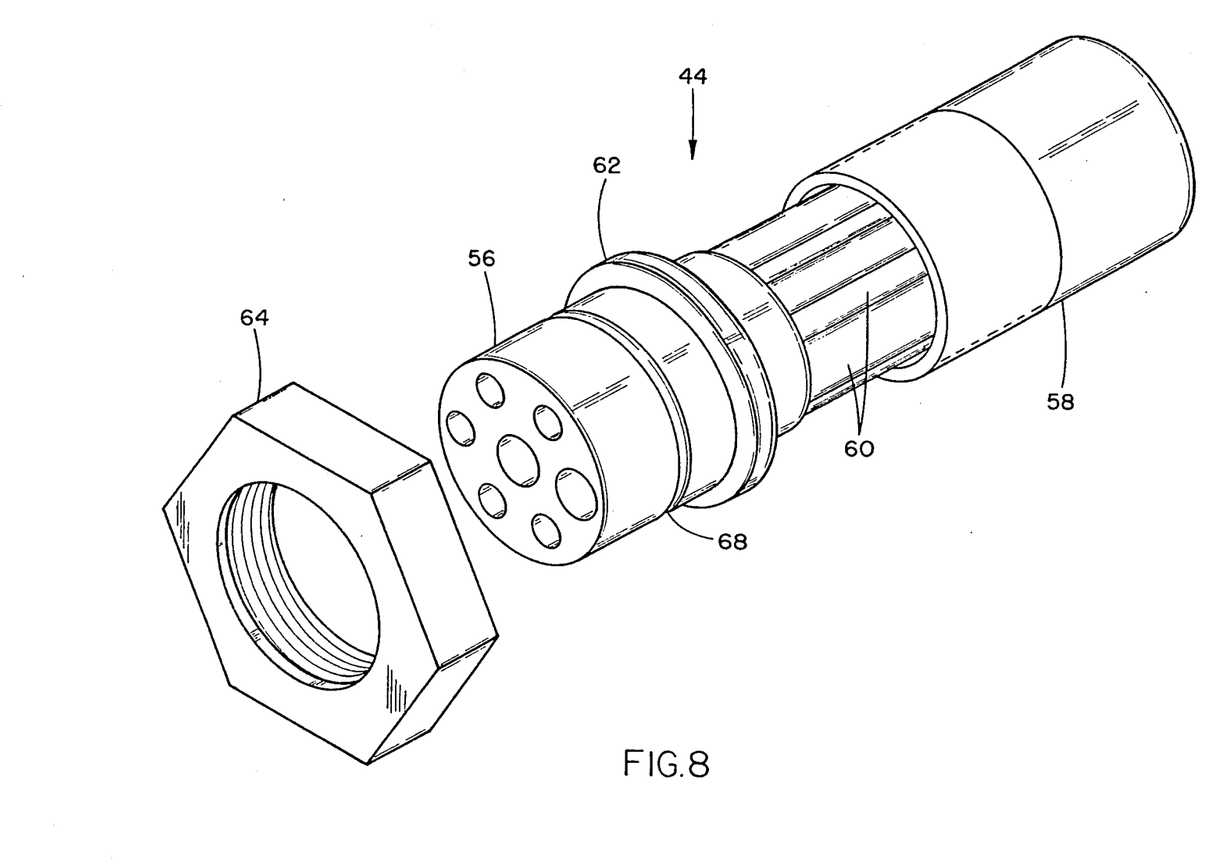
FIG. 8 is a perspective view of the components of the multichannel receiving coupling in a disassembled state.

Referring to FIG. 8, the receiving coupling 44 is constructed of several major components, including a major housing member 56 defining the channel ports at one end and having corresponding projecting tubular connections at the opposite end, over which tubular hoses 60 are mounted. The outer casing of the multichannel-receiving conduit is attached to an externally threaded tubular member 58, through which the seven individual delivery tubes 60 of the conduit pass. The coupling housing 56 has a circumferential collar 62 defined there-around, against which one end of the tubular member 58 abuts. A large nut 64 with an internal collar 65 passes over the opposite end of the coupling housing 56, with the collar 65 axially abutting against the collar 62, and threadedly engages and attaches to the tubular member 58, drawing that member snugly against the collar 62, thereby assembling the major components of the receiving coupling 44 into one unitary assembly.

Figure 9:
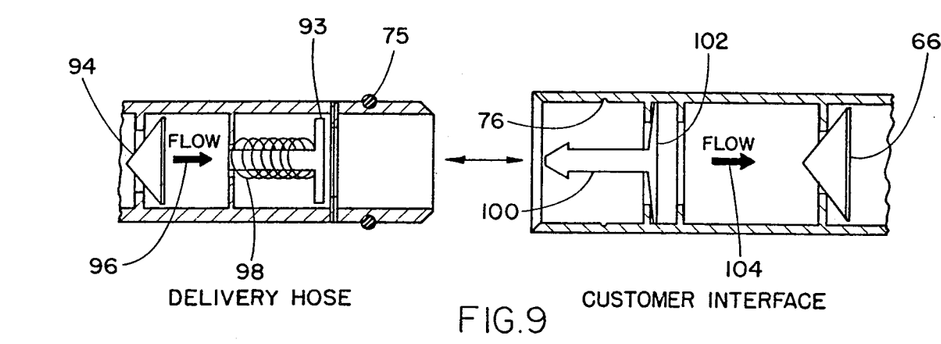
FIG. 9 illustrates a schematic arrangement of a closure valve and check valves provided in the connection of one channel of the multichannel couplings.

The receiving coupling 44 also includes a check valve for each channel port which operates in a manner known, per se in the art and shown in greater detail in FIG. 9, to prevent a reverse flow of syrup through the channel port in the event of a pressure reversal. The delivery coupling housing 56 also defines a groove 68 extending circumferentially around the housing body. This groove 68 cooperates with a plurality of radially displaceable balls or detents in the delivery coupling 32 to secure and lock the two couplings together, in a manner explained in greater detail hereinbelow.

The delivery coupling 32 is constructed with a generally cylindrical opening into which the projecting cylindrical portion of receiving housing 56 is adapted to be inserted Within the cylindrical opening, seven axially projecting male tubular connectors 72 are arranged in a pattern to match the seven channel ports of the receiving coupling 44, with two of the tubular connectors having a larger diameter to match channel ports 52 and 54. Each male tubular connection has a groove 74 extending circumferentially around its outer surface in which an O ring 75, FIG. 9, is normally positioned to provide a seal between each male tubular connector and a corresponding internal groove 76, FIG. 9, in its corresponding channel port when the delivery and receiving coupling are connected together. A seal is established during the initial part of the connection such that the seals are functional prior to opening of the closure valves in the delivery coupling 32, as described in greater detail hereinbelow.

The cylindrical housing member 70, which is preferably constructed of metal such as aluminum, has a circumferential collar 78 defined therearound. A generally cylindrical housing member 80, which may be formed of plastic, fits over the external cylindrical surface of the delivery coupling housing member 70, and its axially displaceable relative thereto, as indicated by arrow 82, FIG. 7. A plurality of set screws 84 project radially inwardly from a circumferential collar 86 of the housing member 70 and extended into axially extending grooves 88 formed in the outer cylindrical surface of cylindrical housing member 70 to limit and define the axial displacement of housing member 80 relative to housing member 70.

Figure 7:
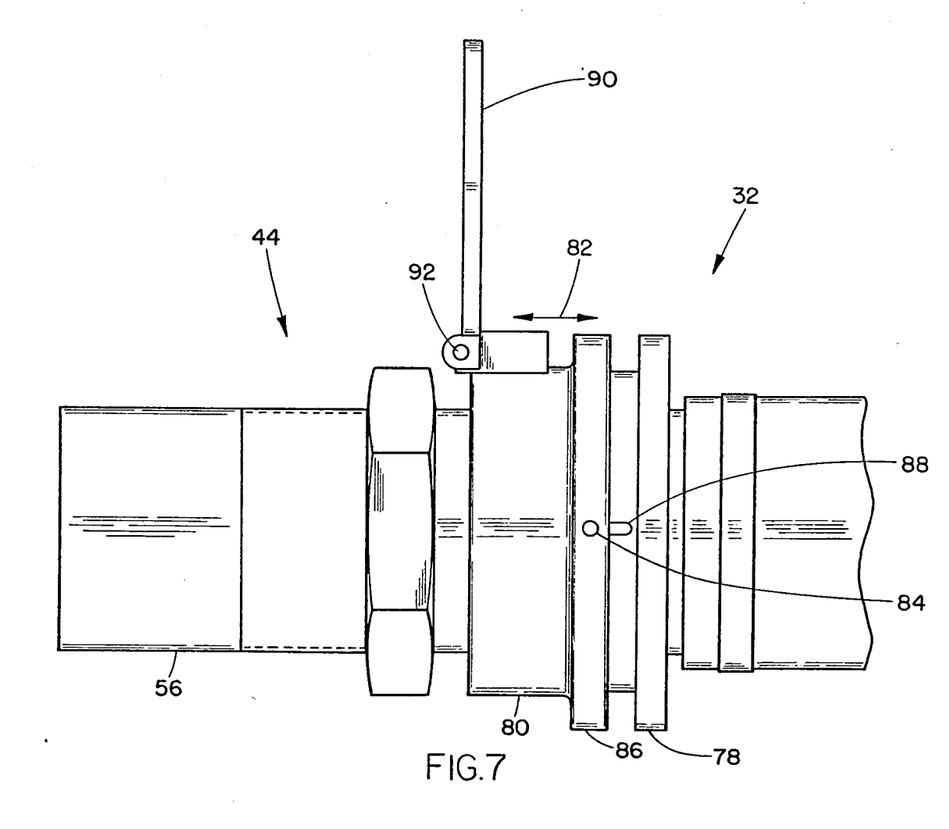
FIG. 7 illustrates the multichannel couplings of FIG. 5 coupled to each other in an operative delivery position.

The housing member 80 is axially displaceable between a position as illustrated in FIG. 7, in which the delivery and receiving couplings are not locked together, and a position as illustrated in FIG. 6, in which the shoulder 86 of the plastic housing member 80 abuts against the collar 78, in which the delivery and receiving couplings 32, 44 are normally locked together. For this purpose, a plurality of locking detents or balls 89 are spaced circumferentially around the inner cylindrical surface of the cylindrical housing member 70. The inner surface of housing member 80 defines a very slightly tapered frustoconical surface with the wider diameter portion thereof near shoulder 86. In this arrangement, axial displacement of housing member 80 to a position whereat shoulders 78 and 86 abut each other causes a radially inward movement of locking balls or detents 89 into the circumferential groove 68 on housing 56 to lock the two couplings 32 and 44 together duting a syrup delivery operation.

The delivery coupling 32 includes a round cover plate 90, hingedly mounted at 92 to the housing member 80, which normally is closed to cover and protect all of the elements within housing member 70 between syrup delivery operations. The cover plate 90 is pivoted back and away from the housing member 80 prior to connection for a syrup delivery, as illustrated in both FIGS. 6 and 7.

FIG. 9 illustrates schematically the arrangement of a closure valve 93 and a check valve 94 provided in each male tubular connector 72 of the delivery coupling 32. The check valve includes an axially moveable, generally conical valve element 94 which allows a fluid flow in the direction of arrow 96, but which is forced closed by any attempted flow in the oppposite directions. A spring 98 biased closure valve 93 is opened by a central axially extending cone shaped pin 100 forming part of the valve arrangement which is positioned in the corresponding channel port upon connection of the two components. The pin 100 can be mounted by a spider member 102 in the channel port. The conical check valve 66 in the channel port functions similar to the check valve 94 to allow fluid flow only in the direction of arrow 104. The check and closure valves are incorporated into the delivery hose coupling and customer coupling or interface units of the bulk delivery system to ensure that the system passes fluids only when properly connected to an intertace. The interface has check valves therein to prevent the release of liquid or gas at filling port. The spring loaded seal or closure valve 93 each line is opened only when contacted by the pin 100 of the customer interface seal, and these seals are positioned within the respective lines at a proper distance to ensure; proper mating before fluid or gas is permitted to flow therethrough.

Figure 10:
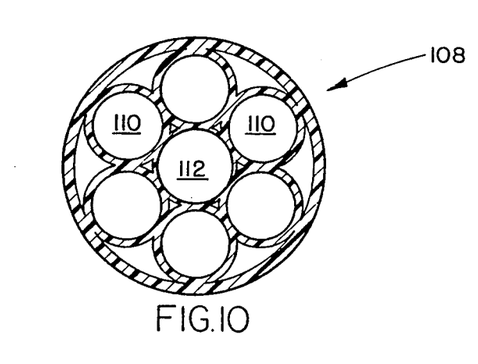
FIG. 10 is a cross sectioned view of a second embodiment of a multichannel delivery hose or conduit formed as a one piece, extruded honeycomb hose.

FIG. 10 illustrates a sectional view of an exemplary embodiment of a multichannel honeycomb delivery hose or conduit 108, which can advantageously be extruded in a suitable plastic in one piece through an appropriate extrusion die. This exemplary multichannel conduit has six separate circumferential channels 110 therein and one slightly larger central channel 112, but obviously this principle encompasses other extruded honeycomb embodiments having a greater or lesser number of conduits or conduit shapes in alternate honeycomb configurations.

The bulk syrup delivery system of the present invention could be modified in many respects from the illustrated embodiment, for instance, with regard to the number and arrangement of channels, the design of the closure and check valves, a reversal of male to female fittings, etc. Also, the delivery and receiving tanks can be insulated, as appropriate, in different embodiments. One alternative embodiment could combine a carbon dioxide delivery system, with the provision of carbon dioxide delivery and storage tanks and also the provision of a carbon dioxide delivery channel. In this embodiment, the pressurizing carbon dioxide tanks 16 could be eliminated in favor of a single insulated carbon dioxide delivery tank on the truck which would serve to both supply pressure to the syrup tanks 12, 14 and also deliver carbon dioxide to an insulated carbon dioxide storage tank at the account.

Figure 11:
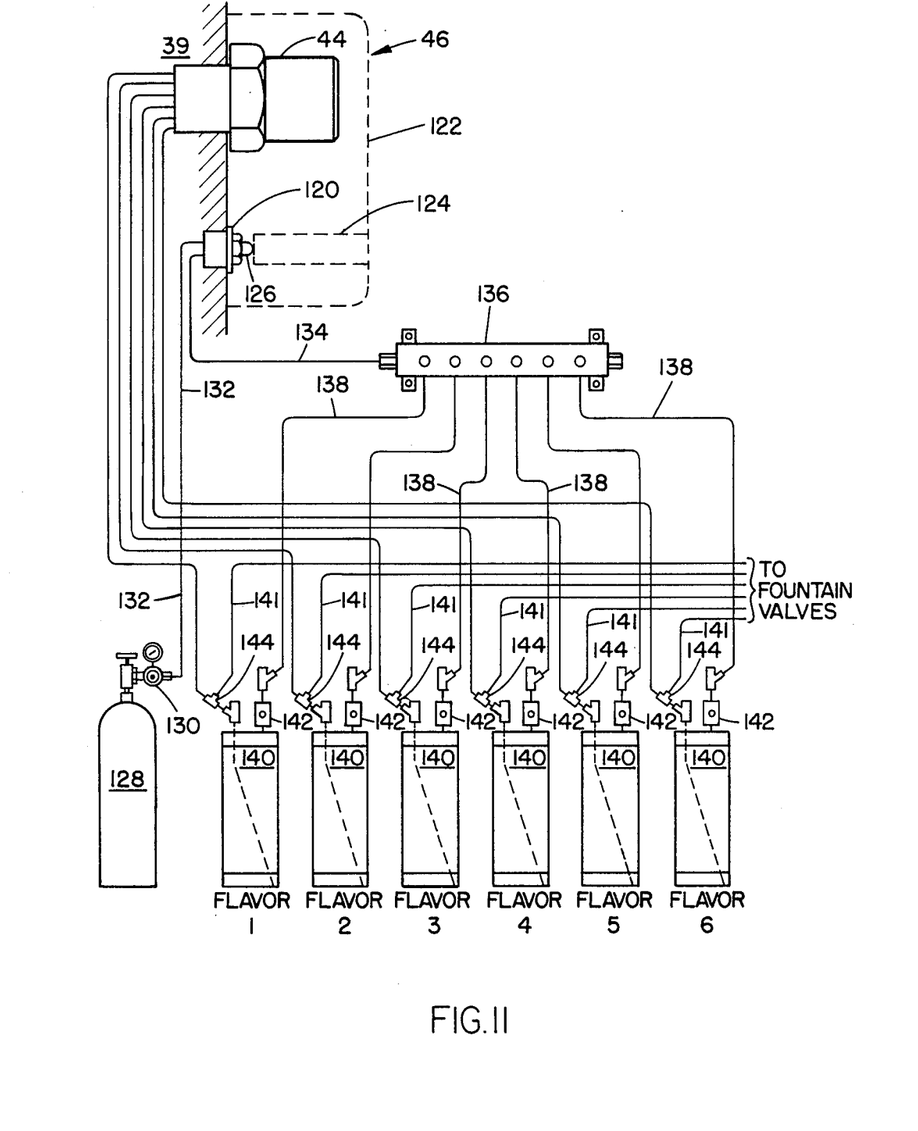
FIG. 11 illustrates a preferred embodiment of a syrup delivery arrangement at an account, and particularly illustrates the syrup delivery and pressurized supply lines therein, and a preferred arrangement of a three way vent and pressure supply valve in an account terminal housing.

FIG. 11 illustrates further details of the mounting of a three way valve 120 in a terminal housing 40 in association with a receiving coupling 44 also mounted within the terminal housing 40. In the position illustrated in FIG. 11, the terminal housing 40 is fully closed and would normally be locked, as during normal syrup dispensing operations at the account. The terminal housing 40 includes a hinged and openable housing cover 122 with an actuator element 124 attached thereto such that when the housing cover is closed, the actuator element 124 contacts a valve actuator 126 to cause the three way valve to assume a first position during normal system dispensing operations.

In the first position of the three way valve 120, pressurized gas, typically carbon dioxide, is supplied from a pressurized gas source, such as a carbon dioxide cylinder 128 through a pressure regulator 130, to a pressure supply line 132 to the three way valve 120, through valve 120 to a pressure supply line 134 to a distributor manifold 136, through a plurality of individual syrup storage tank pressure supply lines 138, to a plurality of individual syrup storage tanks 140. The pressurized storage tanks then deliver syrup under pressure through a plurality of individual syrup supply lines 141 leading to the individual fountain valves which dispense the syrup, along with carbonated water, during a typical dispensing operation.

Figure 12:
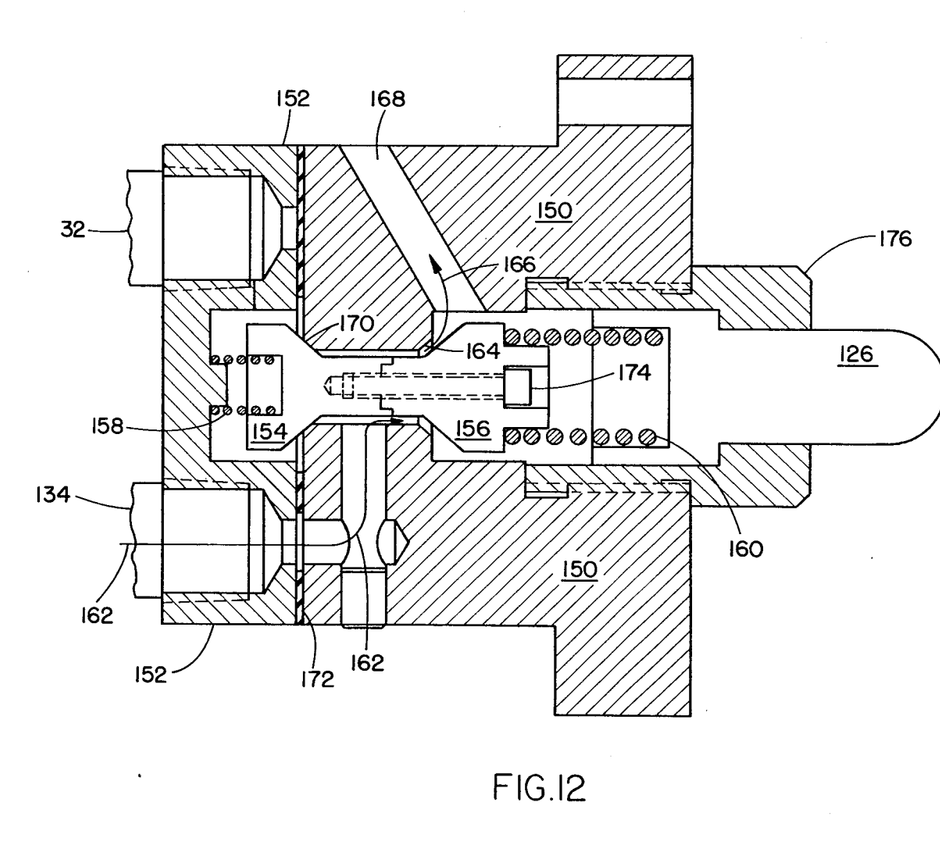
FIG. 12 is a sectional view of an exemplary embodiment of the three way vent and pressure supply valve.

In the second position of the three way valve 120, illustrated in FIG. 12, any pressure existant in the individual syrup storage and supply tanks 140 is allowed to vent back through supply lines 138, manifold 136, and supply line 134 to valve 120 where it is vented to the atmosphere. Moreover, in the second position of the three way valve 120, pressure from supply cylinder 128 and line 132 is cut off at the valve 120.

As illustrated in FIG. 11, each syrup storage and supply tank 140 can be provided with a float assembly 142 to prevent syrup from flowing upwardly through the individual pressure supply lines 138, particularly during a bulk syrup delivery operations. Each syrup storage tank 140 is also provided with a tee 144 which allows syrup to flow therethrough from receiving coupling 44 to the syrup storage tank 140 during a bulk syrup delivery operation, and which also allows syrup to flow therethrough from a syrup storage tank 140 to a syrup supply line 141 during a syrup dispensing operation (when the check valves in receiving coupling 44 are all closed).

FIG. 12 is a sectional view of an exemplary embodiment of a three way vent and pressure supply valve 120, illustrated in its second position in which it vents the system. The major components of valve 120 include a main valve body 150 and a valve end 152 mounted thereto, a valve stem assembly which includes first and second valve stems 154 and 156, a biasing spring 158 to bias the valve system assembly to its second, vent position, an actuator 126, and an associated actuator spring 160, which is larger and has a larger spring constant than biasing spring 158.

In FIG. 12, the three way valve is illustrated in the second, vent position it assumes under the influence of biasing spring 158 during a syrup delivery operation in which any pressurized gas in line 134 travels along arrow 162, by the valve seat 164 associated with the second valve stem 156, along arrow 166 to a vent to atmosphere 168. The pressure supply line 132 is effectively closed by the first valve stem 154 bearing against the valve seat 170 associated therewith.

When the housing cover 122 is closed, as after a bulk syrup delivery operation is completed, actuator element 124 bears against actuator shaft 126 which, through actuator spring 160 shifts the valve stem assembly to the left, closing the second valve stem 156 against valve seat 164, and opening the first valve stem 154 relative to its associated valve seat 170. Pressurized carbon dioxide then flows from the pressure supply line 132, past open valve stem and seat 154, 170, into the pressure supply line 134. Atmospheric vent 156 is now sealed by the closed valve stem and seat 156, 164.

Referring to FIG. 12 for further constructional details, the valve end 152 is sealed relative to the valve body 150 by a gasket 172, and is attached thereto by several longitudinally extending bolts or screws, not shown. The valve stems 154, 156 can be secured together by a single axially extending bolt or screw 174. A bonnet 176 surrounding actuator 126 is threadedly secured to the valve housing 150.

While one detailed design of the valve assembly 120 has been described, other alternative designs for the three way valve would also be suitable While several embodiments and variations of the pesent invention for a bulk syrup delivery system are described in detail herein, it should be apparent that the disclosure and teaching of the present invention will suggest many alternative designs to those skilled in the art.

What is claimed is:

1. A bulk syrup system for the bulk delivery to an account of a plurality of different flavored syrups, in which a compartmentized tank delivery truck has a plurality of separate compartments for the storage and delivery of a plurality of different flavored syrups, and a multichannel delivery hose is coupled to the plurality of separate compartments and has at least one channel for each different flavored syrup, with a multichannel delivery coupling at the delivery end of the multichannel delivery hose, a bulk syrup receiving and delivery arrangement at an account, comprising:

a. a plurality of separate tanks at an account, one for each different flavored syrup, with the account including a receiving terminal in which a corresponding matching multichann receiving coupling is provided for connection to the delivery coupling;

b. means pressurizing each of the separate tanks at an account allow the tanks to pump syrup during a syrup dispensing operation, including a source of pressurized gas, and at least one pressure supply line leading from said source of pressurized gas to said plurality of separate tanks; and c. a three way valve positioned in said pressure supply line, said three way valve having a first position, assumed during normal syrup dispensing operations, in which pressurized gas is supplied through said three way valve to said plurality of separate tanks and a second position, assumed during a bulk syrup delivery operation, in which the source of pressurized gas is disconnected from the plurality of separate tanks, and the plurality of separate tanks are vented to vent any pressurized gas therein.

2. A bulk syrup delivery system as specified in claim 1, said three way valve being mounted at said receiving terminal.

3. A bulk syrup delivery system as specified in claim 2, said receiving terminal being mounted exterior to a building at the account, and comprising an openable terminal housing with a lock thereon to prevent unauthorized access thereto, and said three way valve being coupled to said openable terminal housing to assume said first position when the terminal housing is closed, as during normal syrup dispensing operations, and to assume said second position when the terminal housing is opened, as during a syrup delivery operation.

4. A bulk syrup delivery system as specified in claim 3, said receiving terminal having a hinged cover, and said three way valve having an actuator shaft which is axially displaced during opening and closing of said hinged cover.

* * * * *